United States Patent
van der Lely

[11] 4,106,567
[45] Aug. 15, 1978

[54] SOIL CULTIVATING IMPLEMENTS

[76] Inventor: Cornelis van der Lely, 7, Brüschenrain, Zug, Switzerland

[21] Appl. No.: 723,726

[22] Filed: Sep. 16, 1976

[30] Foreign Application Priority Data

Sep. 19, 1975 [NL] Netherlands .......................... 7511052

[51] Int. Cl.² ............................................ A01B 33/06
[52] U.S. Cl. ...................................... 172/59; 172/713
[58] Field of Search ................... 172/59, 111, 72, 526, 172/707, 711, 523

[56] References Cited

U.S. PATENT DOCUMENTS

| 25,736 | 10/1859 | Hogle | 172/526 |
| 1,591,925 | 7/1926 | Martin | 172/523 X |
| 3,667,551 | 6/1972 | Lely et al. | 172/111 |
| 3,783,948 | 1/1974 | Lely et al. | 172/59 |
| 3,944,002 | 3/1976 | Lely et al. | 172/52 |

Primary Examiner—Richard J. Johnson
Attorney, Agent, or Firm—Mason, Mason and Albright

[57] ABSTRACT

A cultivating implement has cultivating members that are driven to rotate about a first upwardly extending axis. Each cultivating member preferably has three working members, that are freely rotatable about respective second upwardly extending axes, and downwardly extending tines. The tines can be journalled for free rotation at the corners of a triangular plate-shaped support and can be mounted in pairs on a bracket that affords protection to the connection points of the tines. The tines can be strip-shaped with trailing lower operative portions.

11 Claims, 10 Drawing Figures

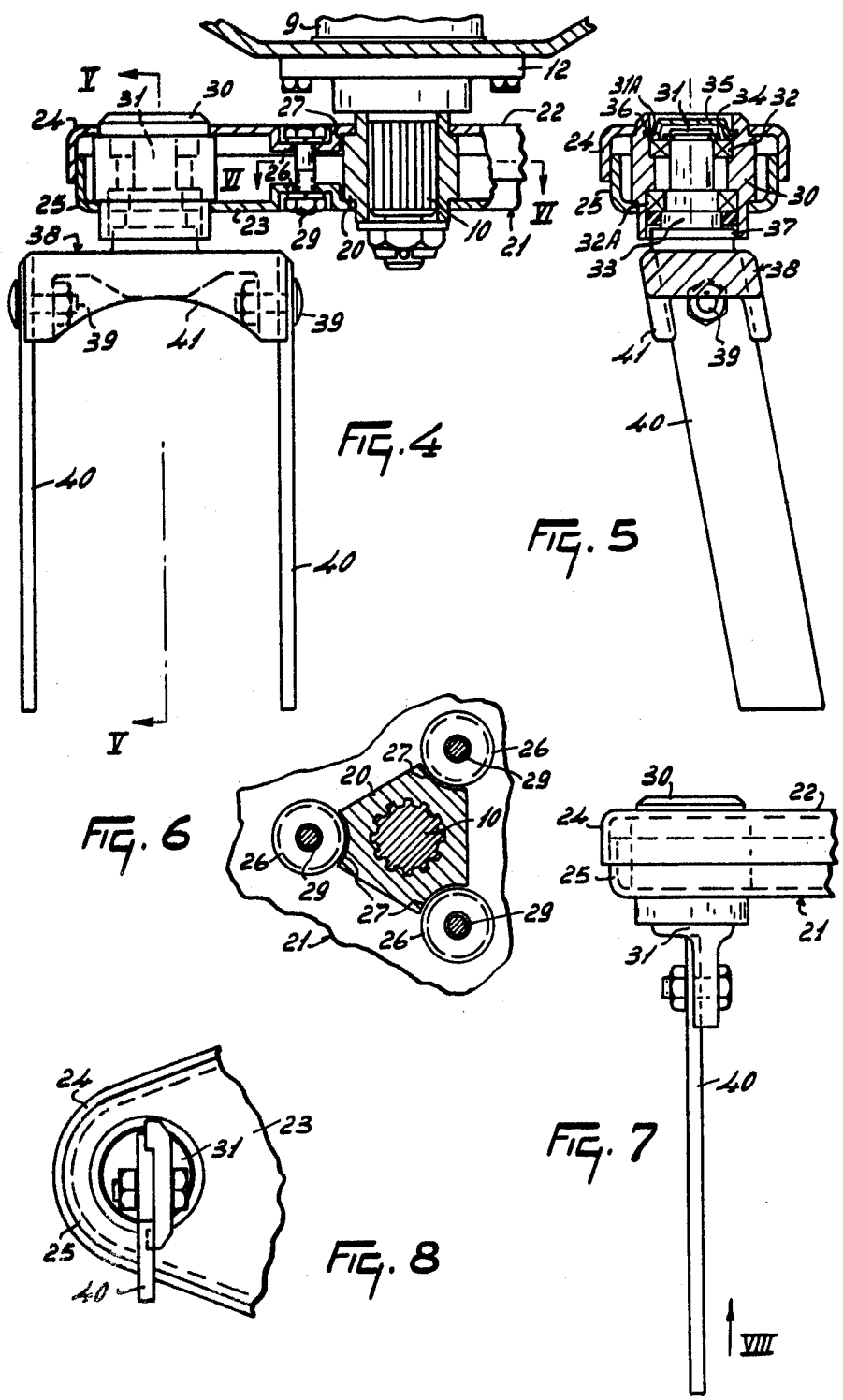

SOIL CULTIVATING IMPLEMENTS

This invention relates to soil cultivating implements.

According to the present invention there is provided a soil cultivating inplement comprising a plurality of cultivating members including a plurality of working members; a cultivating member rotating about a respective upwardly extending first axis in operation of the implement, and a working member in such operation turning about a respective upwardly extending second axis that itself rotates about said first axis with an operative portion of the working member trailing it. Such a construction facilitates designing the cultivating member such that in operation it can match constantly varying conditions of the soil being worked.

Figure 1:
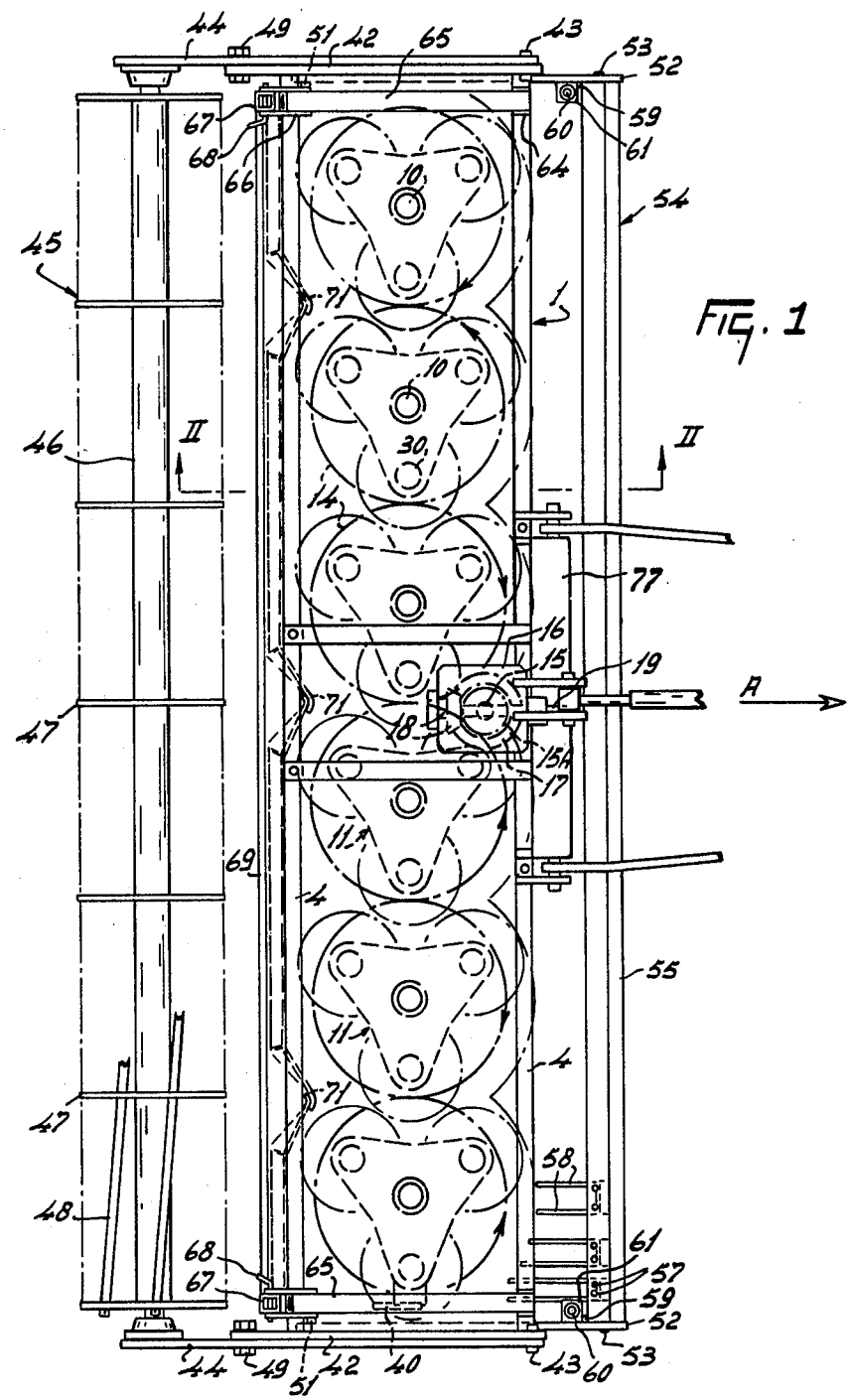
Figure 2:
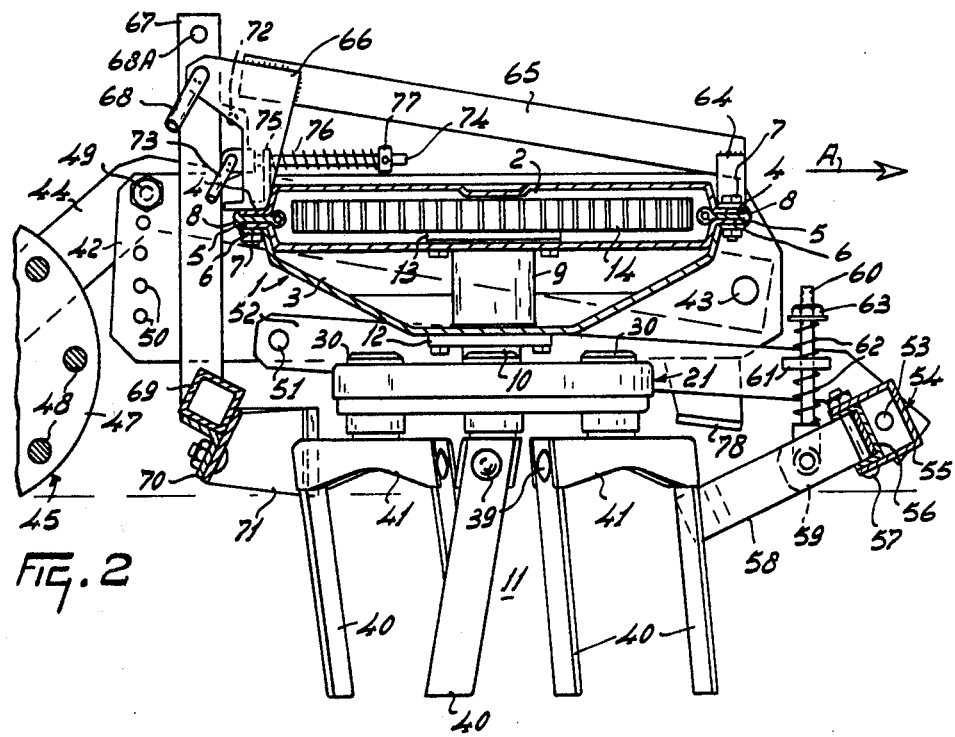
Figure 3:
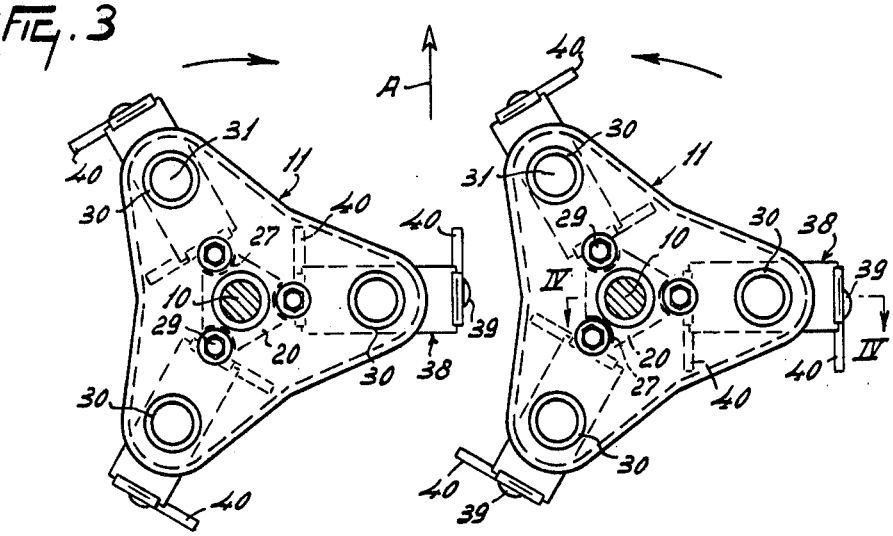
Figure 9:
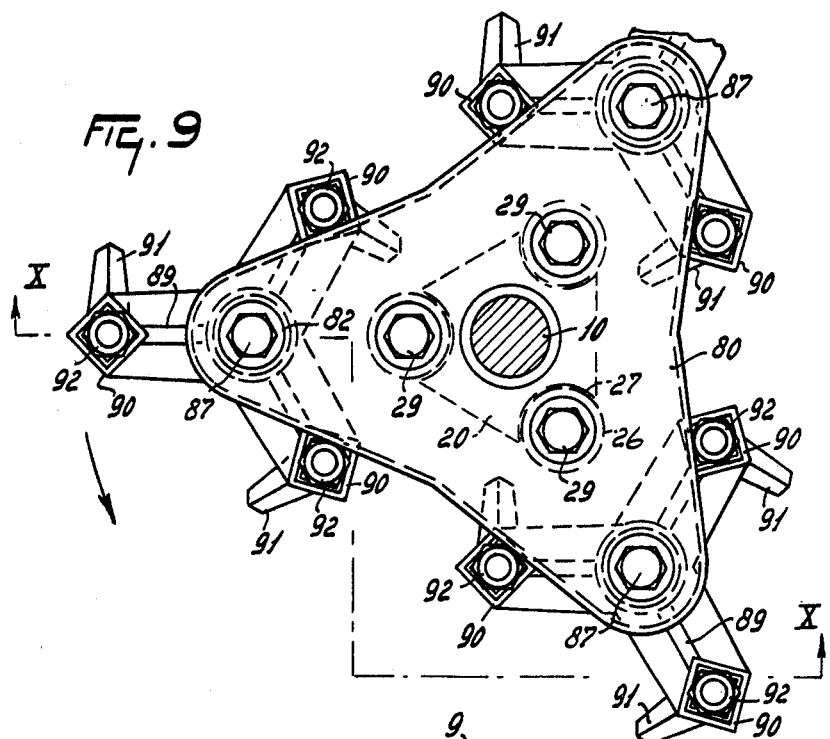
Figure 10:
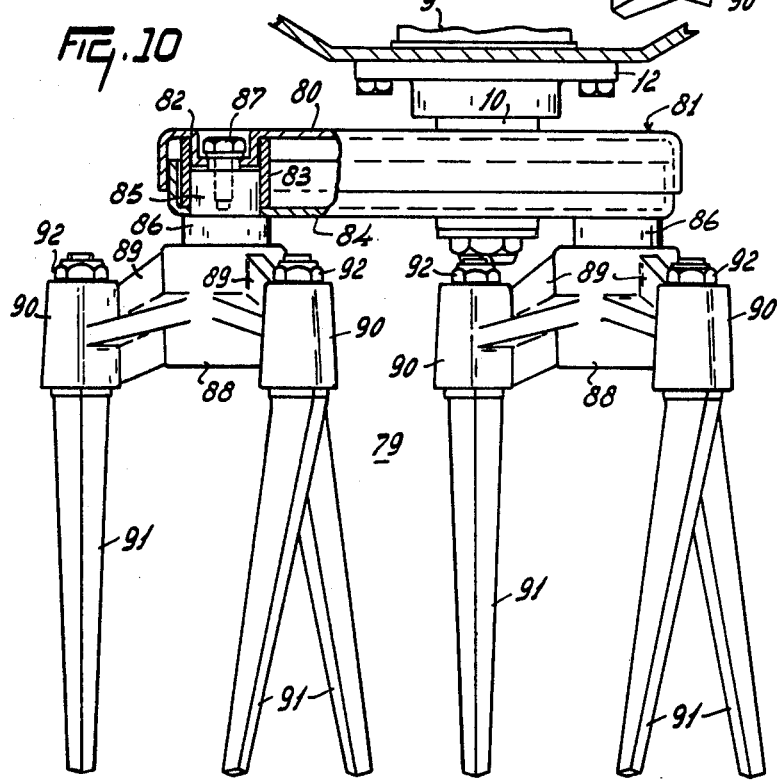

For a better understanding of the invention and to show how the same may be carried into effect, reference will now be made, by way of example, to the accompanying drawings in which:

FIG. 1 is a diagrammatic plan view of a soil cultivating implement,

FIG. 2 is a sectional view taken on the line II—II in FIG. 1 and drawn to a larger scale, FIG. 3 is a plan view on a scale similar to that of FIG. 2 showing two adjacent cultivating members of the implement, FIG. 4 is a sectional view on a still larger scale on the line IV—IV in FIG. 3, FIG. 5 is a sectional view taken on the line IV—IV in FIG. 4, FIG. 6 is a detail plan view illustrating the connection of a support of a cultivating member with a driving shaft for this cultivating member in the implement of FIGS. 1 to 5, FIG. 7 is a view similar to FIG. 4 of a modified form, FIG. 8 is a view taken in the direction of arrow VIII in FIG. 7, FIG. 9 is a plan view of a second form of cultivating member, and FIG. 10 is a view taken on the line X—X in FIG. 9, partly in section.

The soil cultivating implement shown in FIGS. 1 to 6 has a frame having a hollow, steel-sheet frame portion 1 extending transversely of the intended direction of operative travel A of the implement.

The frame portion 1 includes a casing 2 and a subjacent trough 3 whose longitudinal center lines are substantially horizontal and parallel to one another. The casing 2 has a substantially rectangular cross-section, whereas the trough 3 has side walls extending upwardly and outwardly from the base of the trough so that the broader part of the trough is adjacent the base of the casing. The casing 2 has an upper and a lower wall (its base) formed of sheet material. The upper wall has a horizontal portion terminating along the front and rear edges in downwardly bent-over identical longitudinal sides. Each of these identical longitudinal sides terminates in substantially horizontal clamping rim 4 covering the whole length of the fram portion 1. The lower wall of the casing 2 has a substantially horizontal portion terminating along the front and rear edges in upwardly bent-over idential longitudinal sides. These idential longitudinal sides extend upwardly over a distance which is substantially equal to the distance over which the longitudinal sides of the upper wall extend downwards, and each terminates in a horizontal clamping rim 5. The upwardly outwardly inclined side walls of the trough 3, which extend from a horizontal central portion (its base), are bent over upwardly at the level of the lower wall of the casing and engage the longitudinal sides of this lower wall. These bent-over portions terminate in clamping rims 6. The upper and lower walls of the casing 2 are clamped together by their respective clamping rims 4 and 5 with the aid of bolts 7. Stuffing material 8 of a hard synthetic resin is interposed between the clamping rims 4 and 5. The stuffing material 8 has the shape of a strip having thickened rims. One of the thickened rims is hollow and is engaged by the inner faces of the clamping rims 4 and 5, whereas the other thickened rim is solid with a rounded-off outer side and is engaged by the outer faces of the clamping rims. The clamping rim 6 of the trough 3 constitutes a support for the casing 2 to which the clamped-together rims 4 and 5 are secured by means of bolts which alternate with the bolts 7 such that the trough 3 can be disconnected from the casing 2 without the walls forming the casing moving away from one another.

The base of the casing 2 and of the trough 3 have opposite, circular openings so that the centers thereof are spaced apart by a distance of about 50 cms. The aligned openings receive bearing housings 9 for shafts 10 of rotatable cultivating members 11. Each bearing housing 9 has a lower flange 12 which is bolted to the lower face of the base of the trough 3. The upper end of the bearing housing 9 extends into the casing 2 and has a narrowed part at its upper end which is adapted to co-operate with a ring 13 immediately fitting therearound and having a rim extending into the opening and being bolted to the base of the casing. Between the ring 13 and the base wall of the casing 2 is interposed stuffing material. A circular recess (not shown) in the narrowed part of the bearing housing 9 is also provided with stuffing material so that an effective seal is obtained for preventing leakage of lubricant from the casing 2.

Inside the casing 2 the top end of each shaft 10 is provided with a gear wheel 14 with the gear wheels 14 on the shafts 10 of two adjacent cultivating members 11 drivably in mesh with one another. Near the center of the frame portion 1, at the front, a shaft 15 projecting from the top of the trough 3 is provided with a gear wheel 15A which is adapted to co-operate with the gear wheel 14 on the shaft 10 of a cultivating member 11 located near the middle. The shaft 15 with the gear wheel 15A is supported in bearings in the lower and upper walls of the casing 2 and extends into a gear box 16 on the top of the casing 2. Inside the gear box 16 a bevel gear wheel 17 on the shaft 15 is drivably connected with a bevel gear wheel 18 on a shaft 19 extending in the direction of travel A and projecting from the front of the gear box 16, where it can be coupled through an auxiliary shaft with the power take-off shaft of a tractor.

Each shaft 10 is provided at its end projecting from the bottom of the frame portion 1 and having key ways with a hub 20 of a support 21. The hub 20 is fixed to the end of the shaft 10 by means of a locking ring and a nut. Each support 21 includes two relatively co-operating plates 22 and 23, each having at their circumference a rim 24 and a 25 respectively bent-over at right angles so that the lower plate 23 is located with its upwardly bent-over rim 25 inside the downwardly bent-over rim 24 of the upper plate 22 (FIG. 4). Each of the plates 22 and 23 has around the shaft 10 depressions 26 spaced apart by circumferential angles of 120° and being adapted to co-operate on the side of the shaft with recesses 27 in the hub 20. The depressions 26 receive the heads of bolts 29 by means of which the plates 22 and 23 and the hub 20 are clamped together.

Viewed in the direction of the rotary axis of each cultivating member 11 its plates 22 and 23 are substantially triangular, but with the corners being rounded off and the sides between the corners of shallow, inwardly-directed V-formation (see FIGS. 1 and 3). At the corners the plates 22 and 23 have opposite, a circular apertures receiving the ends of a bearing housing 30 for a freely rotatable stub shaft 31. Inside the bearing housing 30 ball bearings 32 and 32A are separated by a shoulder from one another. The lower ball bearing 32A bears on a shoulder 33 of the stub shaft 31, whereas the upper ball bearing 32 is enclosed between the shoulder in the bearing housing 30 and a circlip 31A surrounding the stub shaft 31. On the top the bearing housing 30 is closed by means of a cap 35, which is held in place with the aid of a circlip 36. At the bottom the bearing housing is closed by a shoulder 37 on the stub shaft 31. At the end projecting out of the bearing housing 30 each stub shaft 31 is provided with a bracket 38 which is integral with the stub shaft and has limbs that are downwardly inclined away from the web of the bracket located at the center of the stub shaft 31 (FIG. 5) with respect to the longitudinal center line of the stub shaft, which line is substantially parallel to the longitudinal center line of the shaft 10 and forms the rotary axis of the cultivating member 11. The limbs of the bracket 38 have each an aperture in which by means of a bolt 39 a pair of strips making up a soil working member 40 is held in line with the limb. The head of each bolt 39 is located on the outer side, whereas the portion holding the nut is located inside protective members 41 interconnecting the limbs of the bracket 38 and being curved upwardly at the middle (FIG. 4). The strips making up the soil working members 40, which constitute tines, are straight and are preferably made from leaf spring steel. The lower ends of the strips of each working member 40 extend substantially parallel to the plates 22 and 23 of the support 21. The active portion of each of the strips of each working member 40 is located for the major part on one side of a plane passing through the longitudinal center line of the freely rotatable stub shaft 31 and the longitudinal center line of the web of the bracket 38, and is at an angle of about 20° to this plane.

The strips of each working member 40 are spaced apart by equal distances from, and are parallel to, a plane passing through the longitudinal center line of the stub shaft 31 and being at right angles to the longitudinal center line of the web of the bracket 38. The distance between the strips of each working member 40 is preferably about 20 cms.

The distance between the shafts 10 of each cultivating member 11 and the longitudinal center line of the stub shaft 31 is preferably about 17 cms. The stub shafts 31 are preferably spaced apart from one another by a distance of about 35 cms.

In the form of FIGS. 7 and 8 a stub shaft 31 is provided with a working member 40 formed by a single strip of leaf spring steel.

At its end the frame portion 1 is provided with vertical plates 42 extending beyond the frame portion to the front and rear. At the front each of the plates 42 has a stub shaft 43, about which an arm 44 extending along the plate is adapted to turn. The arms 44 extend from their pivotal mounts to near the rear end of their plates 42 in a substantially straight line and are bent over to terminate in a rearwardly and downwardly inclined portion. These portions of the arms 44 hold between them a rotatable crumbler or support member 45 having a central, tubular support 46 along which plate-shaped supports 47 are provided. At the circumferential portions of the plate-shaped supports 47 elongated elements 48 extend helically in the direction of the rotary axis of the support member 45. By means of a bolt 49 co-operating with any selected one of a plurality of holes 50 in the rear of each plate the arms 44 can be set in any selected one of a plurality of positions in order to adjust the position of the support member 45 with respect to the frame portion 1 and thereby to adjust the working depth of the rotating cultivating members 11.

At the level of the rear of the frame portion 1 a stub shaft 51 is provided near the bottom of each plate 42 for a pivotable arm 52 extending forwardly along the plate (FIG. 4). Near the front the arms 52 terminate in downwardly and forwardly inclined portions. Between the arms 52 a support 54 pivotable about its longitudinal center line is supported by means of stub shafts 53. The support 54 includes a channel-section beam 55 receiving at its open rear end a second channel-section beam having shorter limbs so that the ends of the limbs of the two channel-section beams are co-terminous. The channel-section beams 55 and 56 are interconnected by means of bolts 57 arranged in pairs and forming fastenings for strip-shaped elongated elements 58 each of a single length of spring steel arranged between the limbs of the channel-section beam 56. It will be seen from FIG. 2 that the strip-shaped elongated elements 58 are inclined rearwardly and downwardly away from the support 54 and, viewed on plan (Figure) they extend up to the paths described, in operation by the working members 40 of a cultivating member 11. To this end the elements 58 located immediately in front of each shaft 10 are shorter than the elements 58 on either side thereof, which increase in length the further they are from the shaft 10. Although the respective elongated elements have different lengths, they are designated by the same reference numeral for the sake of clearness. Furthermore, from FIG. 1 it will be apparent that the elements 58 located at the region of the middle between the rotary axes of two adjacent cultivating members 11, and which consequently have the greater length, are also the closest to one another, whereas the shorter elements 58 located in the regions directly in front of the rotary axes of the cultivating members 11, are furthest remote from one another. Since the elements 58 located midway between two axes of adjacent cultivating members 11 are closest one another, they can extend as far as possible to the rear.

Ears 59 near the ends of the support 54 hold pivotable rods 60, each passed through an opening in a support 61 on the adjacent arm 52. On either side of the support 61 compression springs 62 are provided on each rod 60, the force exerted by these springs being adjustable by means of a nut 63.

Near each end of the frame portion 1 at the front a pair of supports 64 extends upwardly, these supports holding between then an upwardly and rearwardly inclined arm 65. At the rear end each arm 65 is provided with plate-shaped supports 66 extending downwardly and secured to the rear of the frame portion. The supports 66 on either side of each arm 65 extend to the rear over a distance and constitute ears between which a downwardly extending support 67 is arranged, which is fixed in place with respect to the ears by means of a pin 68. Between the lower ends of the supports 67 a substantially horizontal soil levelling beam 69 extends transversely of the direction of travel A and subtantially parallel to a plane passing through the rotary axes of the cultivating members 11. The beam 69 is hollow and has an angular, preferably square cross-section (FIG. 2). From FIG. 2 it will be apparent that the beam 69 is disposed so that a diagonal is substantially vertical. On the lower faces the beam 69 is provided with an angle-section iron 70 so that one limb of the angle-section iron is in line with one downwardly and rearwardly inclined face at the front of the beam. At the level of the middle between the rotary axes of two adjacent cultivating members 11 the angle-section iron is provided with forwardly inclined and converging plates 71, which overlap one another at the front by bent-over portions (FIG. 1). Away from the beam 69 (that is forwardly) the width of these plates 71 increases (FIG. 2) and the plates are preferably made from elastic material, for example, leaf spring steel. Each plate 71 is curved so that it is substantially coaxial with the rotary axis of the adjacent cultivating member 11, and is located in the proximity of the outermost path described by the working members 40 of this cultivating member. The support 67 for each beam 69 has a second hole 68A for the pin 68 so that the support can be displaced in a direction of height. Near the center each support 67 is provided at the front with two ears 72, one on each side, through which a pin 73 can be passed for fastening a fork-shaped part of a rod 74, which is passed through a support 75 on the frame portion 1 and is surrounded on the side remote from the support 75 by a compression spring 76 which is locked between the support 75 and a locking ring 77 on the free end of the rod 74. With the aid of the rod 74 and the compression spring 76 the support 67 is capable of turning, in operation, against the spring force to the rear about the pin 68, so that it can deflect to the rear.

The implements described above operate as follows. In operation the implement is attached to the three-point lift of a tractor by means of a hitch 78 at the front of the frame portion 1 and the respective cultivating members 11 are driven about upwardly extending axes via the transmission gear described and an auxiliary shaft from the power take-off shaft of the tractor. The adjacent cultivating members 11 thus rotate in the direction of the arcuate arrows in FIG. 1. During the rotation of each cultivating member 11 the working members 40 thereof tend to occupy the position shown in the Figures, in which the major parts of the strips of the working members trail with respect to the longitudinal upwardly extending center lines of the stub shafts 31 about which the working members are rotatable. Owing to their free pivotability and to their operative portions trailing with respect to the direction of rotation, the working members 40 continue to occupy during the rotation of the cultivating members 11, the position most effective for tilling the soil, the working members of adjacent cultivating members tilling overlapping strips of soil, while even on heavy, wet soil a maximum effect in crumbling up the earth is ensured with minimal smearing of the soil. The pivotability of the working members 40 and the leaf spring steel thereof minimises, in operation, the risk of damage due to impact on stones or similar hard objects. In order to prevent the earth from being laterally displaced to an undesirable extent at the front the strip-shaped elements 58 of leaf-spring steel are provided in front of the cultivating members in positions inclined away from their support in downward and rearward direction. The strip-shaped elements 58 capture the earth pushed forwards by the working members 40 of the respective cultivating members 11 and conduct it gradually away to the rear during the travel of the implement. The strip-shaped elements 58 furthermore prepare the strip of soil to be tilled by the cultivating members 11, the elements drawing slots in the ground in the direction of travel A, the crumbling of the earth being thus initiated to some extent. During their passage through the ground the strip-shaped elements 58 are pressed against the ground by means of the spring mechanisms at the ends of their support, while they can deflect upwardly against spring force in the event of impact on stones or similar hard objects. In operation the arms 52 are freely pivotable, a stop 78 limiting an excessive downward movement.

In operation the profiled soil levelling beam 69 located between the rotatable support or crumbler member 45 and the cultivating members 11 is in a position as shown in FIG. 2. The forwardly extending extensions in the form of the plates 71 which are substantially coaxial with the rotary axes of two co-operating cultivating members, capture the earth conducted away to the rear between two cultivating members 11 and conduct it away on either side in a gradual manner, after which the earth is evenly distributed by the levelling beam 69 so that a flat strip of tilled soil is obtained. The levelling beam 69 with the plates 71 can deflect, in operation, against spring force, the beam then turning about the pins 68 by means of which the beam is supported between the supports 66 and the ends of the arms 65. The position of the beam 69 can be changed, since the second holes 68A are provided, for matching the working depth of the cultivating members 11. Since the supports of the cultivating members 11 are made of profiled plates, a reliable and yet simple structure is obtained.

FIGS. 9 and 10 show a cultivating member 79 in which the upper plate 80 of a support 81 has a depression 82 at each corner which is surrounded by a housing 83 located within the plates. Each housing 83 joints an opening in the lower plate 84 in which a stub shaft 85 of a soil working member is located which intimately joins the wall of the housing 83 into which extends the depression in the upper plate 80. The stub shaft 85 engages by a shoulder 86 the lower plate 84 and is secured in place by means of a bolt 87 passed through an opening in the despression 82. Each soil working member includes a support 89 freely rotatable by means of a hub 88 about a respective one of the stub shafts 85. Each support 89 has three arms spaced apart by circumferential angles of 120° about the stub shaft 85 and extending radially from the hub and slightly inclined downwards, these arms having stiffening ridges on both sides carrying holders 90 at the outer ends for the fastening portions of downwardly extending tines 91. The holders 90 taper from bottom to top and have an angular, in the form illustrated square, cross-section, as is shown in FIG. 9. In the respective holders can be fixed the fastening portions of the respective tines 91, which have an angular cross-section and taper towards their free ends. The fastening portion are secured in the respective holders by means of a nut 92 screwed onto the free end of the fastening portion. Each time 91 has an operative portion extending away from the fastening portion and tapering rectilinearly towards its free ends. The operative portion of each tine also has an angular cross-section and can be set in four different positions by turning the fastening portion about its longitudinal axis after release of the nut 92. The longitudinal center line of the operative tine portion is at an angle of at least 15° to the longitudinal center line of the fastening portion of the tine. The position of the tines 91 shown in the Figures the operative portions of the tines trail, in operation, with respect to the direction in which they are caused to rotate about upwardly extending axes by their contact with the ground when the cultivating members are driven to rotate in the directions indicated in FIG. 1 about upwardly extending axes. The groups of tines 91 thus work strips of soil of about 20 cms. The distance between the center lines of the stub shafts 85 and the rotary axes of the cultivating members 79 corresponds with that in the preceding embodiment. When the cultivating members 79 are employed, it is also possible to use the strip-shaped elongated elements 58 at the front in order to prepare the strip of soil to be tilled by the cultivating members and in order to prevent earth from being laterally displaced to an undesirable extent. Moreover, the levelling beam 69 described above may be used so that after the passage of the cultivating members the strip of land is levelled out in the manner described above.

While various features of the soil cultivating implements that have been described, and that are illustrated in the drawings, will be set forth in the following claims as inventive features, it is to be noted that the invention is not necessarily limited to these features and that it encompasses all the features that have been described both individually and in various combinations.

What I claim is:

1. A soil cultivating implement comprising a frame and a plurality of soil cultivating members mounted on a portion of said frame, each of said members being rotatable about a corresponding first axis defined by an upwardly extending shaft supported on said frame portion, driving means connected to rotate said cultivating member about said first axis, said member comprising a support and tine means depending from said support, said tine means being rotatable about a second upwardly extending axis that is rotated around said first axis, said tine means comprising two spaced apart tines having respective fastening portions connected to said support, said tines having respective elongated operative portions which extend substantially parallel to a plane that passes through said second axis and said plane being normal to a line passing between the fastening portions of the tines, said operative portions being inclined to a further plane that passes through said line and the second axis.

2. A soil cultivating implement as claimed in claim 1, wherein said fastening portions are located substantially at equal distances from said second axis.

3. A soil cultivating implement as claimed in claim 1, wherein said operative portions have their widest sides substantially parallel to a plane at right angles to the line of connection between corresponding fastening portions of said tines.

4. A soil cultivating implement as claimed in claim 1, wherein each operative portion has a rectangular configuration.

5. A soil cultivating implement as claimed in claim 1, wherein said tine support is bracket-shaped and said fastening portion is held in a recess in a limb of that support.

6. A soil cultivating implement as claimed in claim 5, wherein the limbs of the bracket-shaped support are substantially in alinement with the fastening portion held therein.

7. A soil cultivating implement as claimed in claim 6, wherein said support affords a protective member for the connections between the fastening portions of the tines and said support.

8. A soil cultivating implement as claimed in claim 7, wherein said bracket-shaped support is integral with a stub shaft and the longitudinal center line of said shaft defines said second axis.

9. A soil cultivating implement as claimed in claim 1, wherein said cultivating member comprises plates which are clamped together by fastening means located within their circumferences.

10. A soil cultivating implement as claimed in claim 9, wherein each working member has a stub shaft that defines said second axis said shaft being supported in a bearing housing which extends into openings in said plates and being clamped between these plates.

11. A soil cultivating implement comprising a frame and a plurality of soil cultivating members mounted on a portion of said frame, each of said members being rotatable about a corresponding first axis defined by an upwardly extending shaft supported on said frame portion, said shafts being arranged in a transverse row with respect to the direction of travel of the implement, driving means connected to rotate said cultivating member about said first axis and neighboring cultivating members being rotated in relative opposite directions, said member comprising a support and pairs of tines depending from said support, each tine pair being freely rotatable about a second upwardly extending axis that is rotated around said first axis, and each pair comprising two tines having respective fastening portions and elongated operative portions, said operative portions extending substantially parallel to one another and being inclined to a plane that passes through said second axis and a line passing between the fastening portions of said tines.

* * * * *